US012801321B2

(12) United States Patent
Li et al.

(10) Patent No.: US 12,801,321 B2
(45) Date of Patent: Nov. 17, 2026

(54) METHOD AND APPARATUS FOR DISPLAYING APPLICATION, ELECTRONIC DEVICE, AND READABLE STORAGE MEDIUM

(71) Applicant: Beijing Xiaomi Mobile Software Co., Ltd., Beijing (CN)

(72) Inventors: Xiaodong Li, Beijing (CN); Jiayan Li, Beijing (CN); Dan Lu, Beijing (CN); Ruiyao Luo, Beijing (CN); Siqi Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 118 days.

(21) Appl. No.: 18/651,315

(22) Filed: Apr. 30, 2024

(65) Prior Publication Data

US 2025/0138765 A1 May 1, 2025

(30) Foreign Application Priority Data

Oct. 26, 2023 (CN) ......................... 202311406107.1

(51) Int. Cl.
*G06F 3/14* (2006.01)

(52) U.S. Cl.
CPC ..................................... *G06F 3/14* (2013.01)

(58) Field of Classification Search
CPC ........... G06F 3/14; G06F 9/451; G06F 16/954
See application file for complete search history.

(56) References Cited

U.S. PATENT DOCUMENTS

2007/0174291 A1* 7/2007 Cooper ............... G06F 16/9577
2009/0013270 A1* 1/2009 Helfman ............... G06F 3/0481 715/764
2015/0278186 A1 10/2015 Zhu
2024/0403380 A1* 12/2024 Tang ..................... G06F 3/0481

FOREIGN PATENT DOCUMENTS

CN 109814953 A 5/2019
CN 111796819 A 10/2020
CN 113687743 A 11/2021
CN 114416056 A 4/2022
CN 115048172 A 9/2022
CN 116719594 A 9/2023
EP 2584462 A1 4/2013
WO 2022068594 A1 4/2022
WO 2023155811 A1 8/2023

OTHER PUBLICATIONS

Liu, C-P. et al., "Study on Dynamic Interface Layout for Android Application," Computer and Modernization (Jisuanji yu Xiandaihua), vol. 213, May 2025, 4 pages.

* cited by examiner

*Primary Examiner* — Chong Wu
(74) *Attorney, Agent, or Firm* — McCoy Russell LLP

(57) ABSTRACT

A method for displaying an application, includes: determining, in response to receiving by the electronic device a first operation on a target application, a first display window for the target application; determining a first display window parameter of the first display window, and determining, based on the first display window parameter, a target layout framework corresponding to the target application; and displaying the target application in the first display window based on the target layout framework.

17 Claims, 10 Drawing Sheets

METHOD AND APPARATUS FOR DISPLAYING APPLICATION, ELECTRONIC DEVICE, AND READABLE STORAGE MEDIUM

CROSS REFERENCE TO RELATED APPLICATIONS

The application is provided based on and claims priority to the Chinese Patent Application No. 202311406107.1, filed on Oct. 26, 2023, the entire contents of which are incorporated herein by reference.

BACKGROUND OF THE INVENTION

An increasing number of electronic devices have been accessible to daily work and life as technologies are constantly developing. Different applications installed in the electronic devices satisfy daily usage demand of users. However, display modes of the same application displayed on different types of electronic devices are generally different.

SUMMARY OF THE INVENTION

The disclosure provides a method and apparatus for displaying an application, an electronic device, and a readable storage medium.

According to a first aspect of an example of the disclosure, a method for displaying an application is provided. The method includes:

- determining, in response to receiving by an electronic device a first operation on a target application, a first display window for the target application;
- determining a first display window parameter of the first display window, and determining, based on the first display window parameter, a target layout framework corresponding to the target application; and
- displaying the target application in the first display window based on the target layout framework.

According to a second aspect of an example of the disclosure, an electric device is provided. The electronic device includes:

- a processor; and
- a memory configured to store a processor-executable instruction.

The processor is configured to:

- determine, in response to receiving by an electronic device a first operation on a target application, a first display window for the target application;
- determine a first display window parameter of the first display window, and determine, based on the first display window parameter, a target layout framework corresponding to the target application; and
- display the target application in the first display window based on the target layout framework.

According to a third aspect of an example of the disclosure, a computer-readable storage medium is provided. The computer-readable storage medium stores a computer program instruction. The program instruction implements steps of the method for displaying an application provided in the first aspect of the disclosure when executed by a processor.

It should be understood that the above general descriptions and the following detailed descriptions are illustrative and explanatory merely, and cannot limit the disclosure.

BRIEF DESCRIPTION OF DRAWINGS

The accompanying drawings here are incorporated into the description as a constituent part of the description, illustrate examples conforming to the disclosure, and serve to explain principles of the disclosure along with the description.

DETAILED DESCRIPTION OF THE INVENTION

Figure 1:
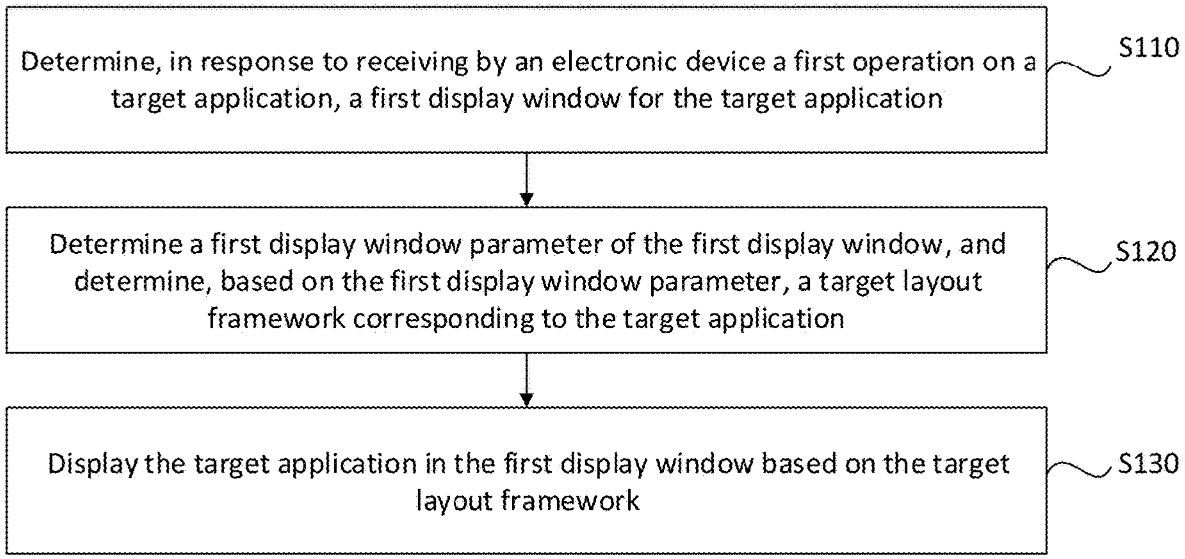
FIG. 1 is a flow diagram of a method for displaying an application as shown according to an example.

Examples will be described in detail here and shown in accompanying drawings illustratively. When the following descriptions relate to accompanying drawings, unless otherwise specified, the same numeral in different accompanying drawings denotes the same or similar elements. The embodiments described in the following examples do not denote all embodiments consistent with the disclosure. On the contrary, the embodiments are merely instances of apparatuses and methods consistent with some aspects of the disclosure as detailed in the appended claims.

The terms "first", "second", etc. used in the descriptions of the disclosure are used for distinguishing between similar objects, but are not necessarily to be understood as particular orders or precedence. In addition, in the descriptions with reference to the accompanying drawings, the same reference numeral in different accompanying drawings denotes the same or similar elements unless otherwise stated.

Although operations or steps are described in the accompanying drawings in specific orders in examples of the disclosure, it should not be understood that these operations or steps are required to be executed in shown specific orders or in serial orders, or that all illustrated operations or steps are required to be executed to achieve expected results. In examples of the disclosure, these operations or steps may be executed in series; these operations or steps may be executed in parallel; or some of these operations or steps may be executed.

In the related art, interface display of each application at different terminals or in different split-screen conditions is required to be independently adapted to rules, such that design and development cost of the application is increased, and flexibility of the application in a display process is not high. Thus, how to better display applications is an urgent technical problem to be solved.

As for this, the disclosure provides a technical solution, which relates to the technical field of terminals, and particularly relates to a method and apparatus for displaying an application, an electronic device, and a readable storage medium.

FIG. 1 is a flow diagram of a method for displaying an application as shown according to an example. As shown in FIG. 1, the method for displaying an application is used in an electronic device and includes the following steps.

Step S110: determine, in response to receiving by the electronic device a first operation on a target application, a first display window for the target application.

In some embodiments, in response to receiving by the electronic device the first operation on the target application, the first display window for the target application may be determined in an example of the disclosure. Here, the first operation may be an operation of opening the target application or may be an operation of adjusting a size of a window for the target application.

Specifically, in a case of detecting that the target application is opened, the first display window for the target application may be obtained in an example of the disclosure. Alternatively, in a case of detecting that a size of a display window for the target application changes, the first display window for the target application may also be obtained in an example of the disclosure. Specific time to obtain the first display window for the target application is not explicitly limited here and can be selected according to actual conditions.

As an optional embodiment, in response to receiving by an electronic device the first operation on the target application, the first display window for the target application may be determined in an example of the disclosure. The first display window for the target application may be a display space of an application container. That is, the first display window may be an application container space.

Step S120: determine a first display window parameter of the first display window, and determine, based on the first display window parameter, a target layout framework corresponding to the target application.

As an optional embodiment, the first display window parameter may be determined based on the first display window for the target application in an example of the disclosure. The first display window parameter may be size information of a display area of the target application on a screen of the electronic device. That is, the first display window parameter may be a window size of the first display window. Here, the size information of the display area may include width information and height information of the window.

In other words, the first display window parameter may include window width information and window height information. A window width may be a width of the target application displayed on the screen of the electronic device. A window height may be a height of the target application displayed on a screen of the electronic device.

In some embodiments, the first display window parameter is configured to represent the window size of the target application displayed on the electronic device. The first display window parameter corresponding to the same application on different electronic devices may be different. Particularly, the first display window parameters of the target application are extremely different in cases of different types of electronic devices. For instance, in a case that the target application is displayed on a mobile phone, the window width in the first display window parameter is w1, the window height in the first display window parameter is h1, and a corresponding first display window parameter is s1. In a case that the target application is displayed on a pad computer, the window width in the first display window parameter is w2, the window height in the first display window parameter is h1, and a corresponding first display window parameter is s2. In this case, w1 is less than w2, such that first display window parameter s1 is different form first display window parameter s2.

Alternatively, even in a case of the same electronic device, the first display window parameter may be different in different usage scenarios. For instance, in a first usage scenario, the pad computer is horizontally placed, and a window width of the pad computer is w3. In a second usage scenario, the pad computer is vertically placed, and a window width of the pad computer is w4. In a case that w3 is greater than w4, first display window parameter s3 is different from first display window parameter s4. It can be seen that corresponding display window parameters may be different in cases of different usage scenarios.

Alternatively, even in a case of the same electronic device, the first display window parameter may be different in the same usage scenario. For instance, when the pad computer is horizontally placed, a user adjusts the window size of the display window for the target application according to personal requirements, such that the target application executes partial split-screen display. The display window parameter of the target application in this case is also different from a display window parameter in a case of a full screen.

To sum up, the first display window parameter of the target application may be a window size displayed by default based on a screen size of the electronic device, or may be a window size obtained by adjusting the size of the display window for the target application by the user according to personal requirements.

As an optional embodiment, the target layout framework corresponding to the target application may be obtained according to the first display window parameter of the target application in an example of the disclosure. If the first display window parameters are different, the corresponding layout frameworks may also be different. In other words, the same target application may correspond to a plurality of layout frameworks, and the corresponding layout frameworks may be different in cases of different display window parameters.

In an example of the disclosure, display windows may be divided into three types according to a preset strategy and in combination with a display window parameter. The three types of display windows may be a small display window, a medium display window and a large display window.

Specifically, in a case that the width in the first display window parameter is less than a first width threshold, the first display window corresponding to the first display window parameter may be classified as a small display window. In a case that the height in the first display window parameter is less than a first height threshold, the first display window corresponding to the first display window parameter may be classified as a small display window. In a case that the width in the first display window parameter is greater than the first width threshold and less than a second width threshold, the first display window corresponding to the first display window parameter may be classified as a medium display window. In a case that the width in the first display window parameter is greater than the second width threshold, the first display window corresponding to the first display window parameter may be classified as a large display window. The first width threshold is less than the second width threshold.

For instance, the first width threshold may be 670, the second width threshold may be 960, and the first height threshold may be 600.

To sum up, after the first display window parameter of the first display window is determined, the window type which the first display window belongs to may be determined based on the width information and/or height information in the first display window parameter in an example of the disclosure. On this basis, the first child layout framework corresponding to the window type is determined as the target layout framework.

In other words, the first display window may be classified in an example of the disclosure. That is, which type of small display window, medium display window or large display window the first display window belongs to is determined and determined as the target window type. On this basis, the target layout framework corresponding to the target application is determined based on the target window type.

As another optional embodiment, the information architecture of the target application may also be obtained in an example of the disclosure. On this basis, the layout framework strategy corresponding to the target application is obtained according to the information architecture. The layout framework strategy may include at least one first child layout framework. Then, a first child layout framework corresponding to the first display window is obtained and determined as the target layout framework.

In an example of the disclosure, the information architecture of the target application may be a preset display architecture. Here, the information architecture may include at least one of navigation information, list information, detail information, etc. The list information may also include a plurality of list items. The information architecture may be preset by a developer according to functions, attributes, etc. of the target application. The electronic device may display the target application based on the information architecture.

It should be noted that information architectures of some applications may include navigation, list and content detail, while information architectures of some applications may include list and content detail. What the information architecture specifically includes may be determined by the attributes, functions, etc. of the application and will not be explicitly limited here. In addition, the information architecture of the application may also include other contents. The above contents are merely instances, and specific contents are subject to actual conditions.

It should also be noted that the target application in an example of the disclosure may be any application installed on the electronic device. For instance, the target application may be a "note" application, an "album" application, a "file management" application, a "clock" application, or a "setting" application, etc. Different applications correspond to different information architectures.

In some embodiments, different information architectures correspond to different layout framework strategies. In an example of the disclosure, a target framework may be obtained in advance and adaptively display an application in cases of any type and any screen size. In order to better understand the target framework, an example of the disclosure provides an illustrative diagram shown in FIG. 2. It can be known from FIG. 2 that the target framework is a multi-node dendritical structural diagram having a four-layer depth. A first layer is entrance, a second layer is navigation, a third layer is list, and a fourth layer is content detail.

As an optional embodiment, in an example of the disclosure, information architectures in different applications/services may be subject to structural classification according to a target framework and user requirements, such that a plurality of layout framework strategies are obtained. Different applications may correspond to different layout framework strategies.

The layout framework strategy may include at least one first child layout framework. Here, the layout framework strategy may be a display strategy of the target application, that is, how the target application is specifically displayed on the electronic device.

Alternatively, after the layout framework strategy corresponding to the target application is obtained, a first child layout framework corresponding to the first display window may be obtained and determined as the target layout framework in an example of the disclosure. Specifically, in an example of the disclosure, the first display window parameter for determining the first display window may be obtained, and the first child layout framework is determined based on the first display window parameter and determined as the target layout framework.

Figure 2:
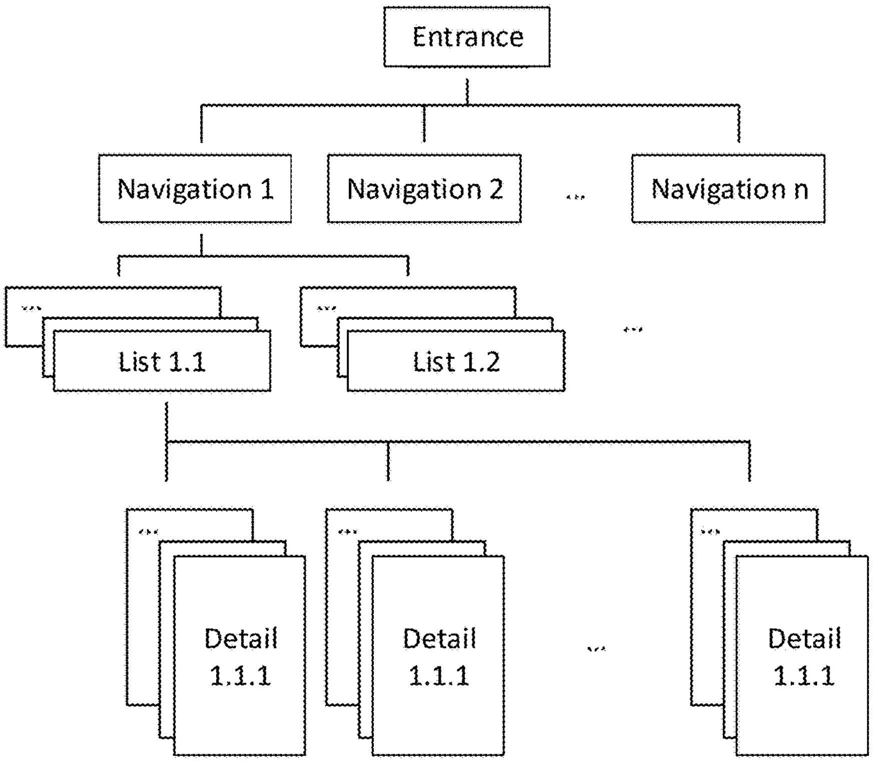
FIG. 2 is an illustrative diagram of a target framework in a method for displaying an application as shown according to an example.

In an example of the disclosure, contents in each framework may be atomized first. As shown in FIG. 2, the window type of the display window may be obtained through permutation and combination and in combination with the display window parameter (such as the screen size) of the application. On this basis, different layout framework strategies may be obtained according to the window type. That is, various layout framework strategies may be obtained through an atomic element combination method.

Figure 3:
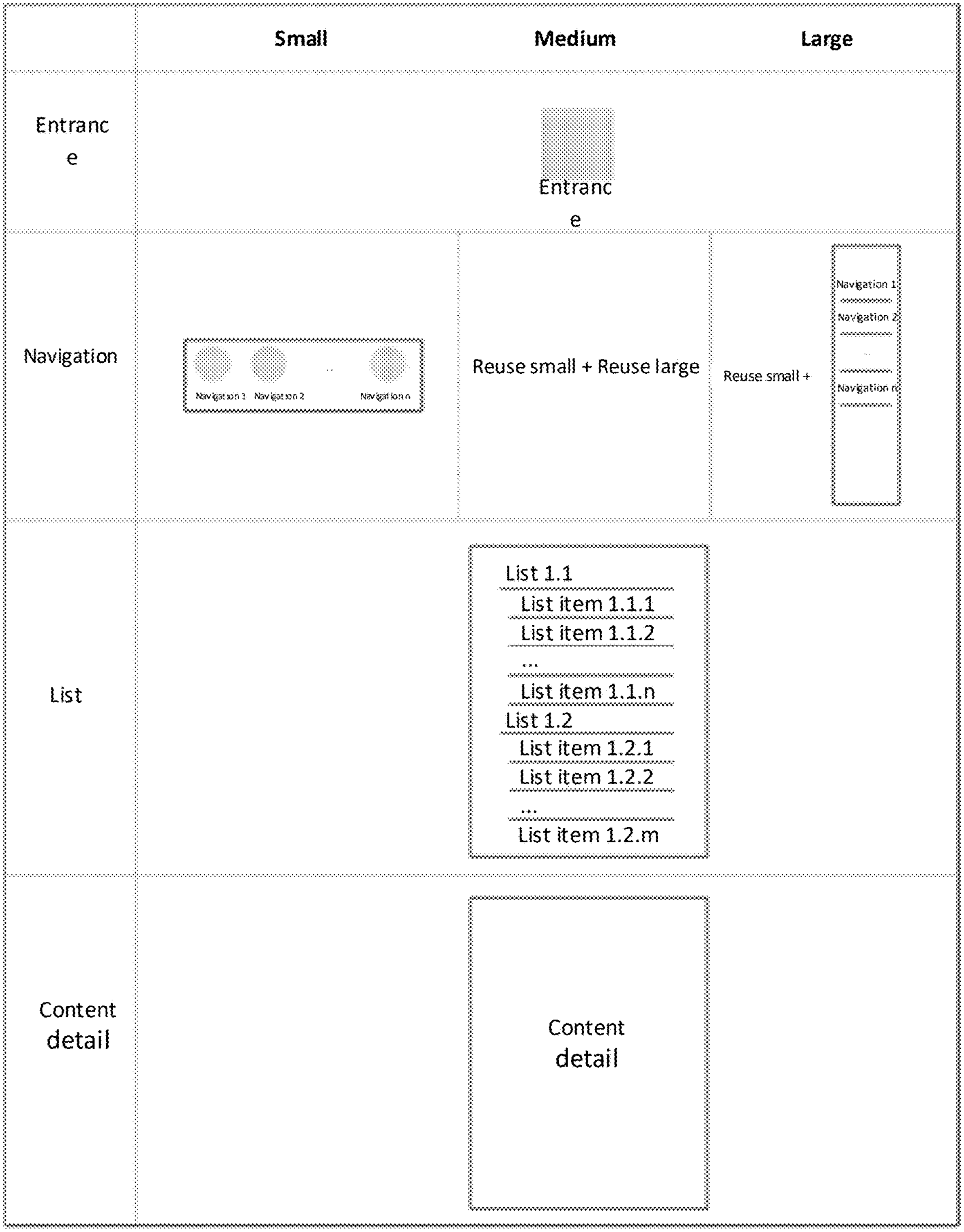
FIG. 3 is an illustrative diagram of obtaining child layout frameworks by arbitrarily combining different display windows in a method for displaying an application as shown according to an example.

For instance, corresponding containers may be provided on information levels shown in FIG. 2 according to window types (size types) of the different display windows. As shown in FIG. 3 in detail, it can be known from FIG. 3 that if the window types of the display windows are different, corresponding child layout frameworks may also be different. For instance, in a case that the window type of the display window is a large display window, the display window corresponds to child layout framework 1. For another instance, in a case that the window type of the display window is a medium display window, the display window corresponds to child layout framework 2.

In cases of different screen sizes, a container may be designed for each of a plurality of levels in an example of the disclosure. For instance, in a case of a navigator shown in FIG. 3, a plurality of navigators may be horizontally arranged (arranged side by side) on a small screen. Alternatively, a plurality of navigators (tabular containers from top to bottom) may be vertically arranged on a large screen, or the small screen may be reused. Alternatively, a plurality of navigators may be horizontally or vertically arranged on the medium screen. That is, the medium screen may reuse the small screen or large screen.

In addition, window types of different display windows are combined with different information architectures such that various layout framework strategies can be obtained. In other words, a large layout, a medium layout, and a small layout may constitute a layout framework strategy.

For instance, the plurality of layout framework strategies may include a first layout framework strategy, a second layout framework strategy, a third layout framework strategy, a fourth layout framework strategy and a fifth layout framework strategy. These five layout framework strategies involve different contents and will be introduced in detail in the following examples. It should be noted that other layout framework strategies may also be obtained by combining examples of the disclosure. Specific layout framework strategies will not be described in detail here, and are subject to actual conditions.

To sum up, in an example of the disclosure, layout framework levels applicable to all applications and services can be highly abstracted based on four layers of structures such as entrance, navigation, list and content detail. Logic strategies are clear and maintainability is high. In addition, the application can be correctly and efficiently displayed on containers having any sizes of different types of devices by combining the first display window parameter in the disclosure.

In a case of any application or service, an appropriate layout framework strategy may be selected based on the first display window and the information architecture in an example of the disclosure. In this way, any application or service can be guaranteed by using a limited layout framework strategy, and development cost of the application or service can be reduced.

It should be noted that in an example of the disclosure, the information architecture of the target application may be obtained first, and then the first display window for the target application is obtained; the first display window for the target application may be obtained first, and then the information architecture of the target application is obtained; or the first display window and the information architecture of the target application may be obtained simultaneously. Which specific information is obtained first and which specific information is obtained then are not explicitly limited here.

In addition, the layout framework strategy corresponding to the target application may be obtained according to the information architecture in an example of the disclosure. On this basis, a first child layout framework in a case of the layout framework strategy corresponding to the first display window is obtained. Alternatively, a layout framework corresponding to the target application may also be determined according to the first display window in an example of the disclosure. On this basis, a layout strategy corresponding to the information architecture is obtained. The target layout framework can be determined by combining the layout strategy and the layout framework.

Step S130: display the target application in the first display window based on the target layout framework.

As an optional embodiment, after the target layout framework corresponding to the target application is determined according to the first display window parameter, the target application may be displayed in the first display window based on the target layout framework in an example of the disclosure.

According to an example of the disclosure, in response to receiving by an electronic device a first operation on a target application, a first display window for the target application is determined. Then, a first display window parameter of the first display window is determined. A target layout framework corresponding to the target application is determined based on the first display window parameter. The target application is displayed in the first display window based on the target layout framework. In this way, the disclosure can be adapted to different display windows, that is, different types of electronic devices. Further, cost of service access can be reduced, and flexibility of displaying the application can be improved.

Figure 4:
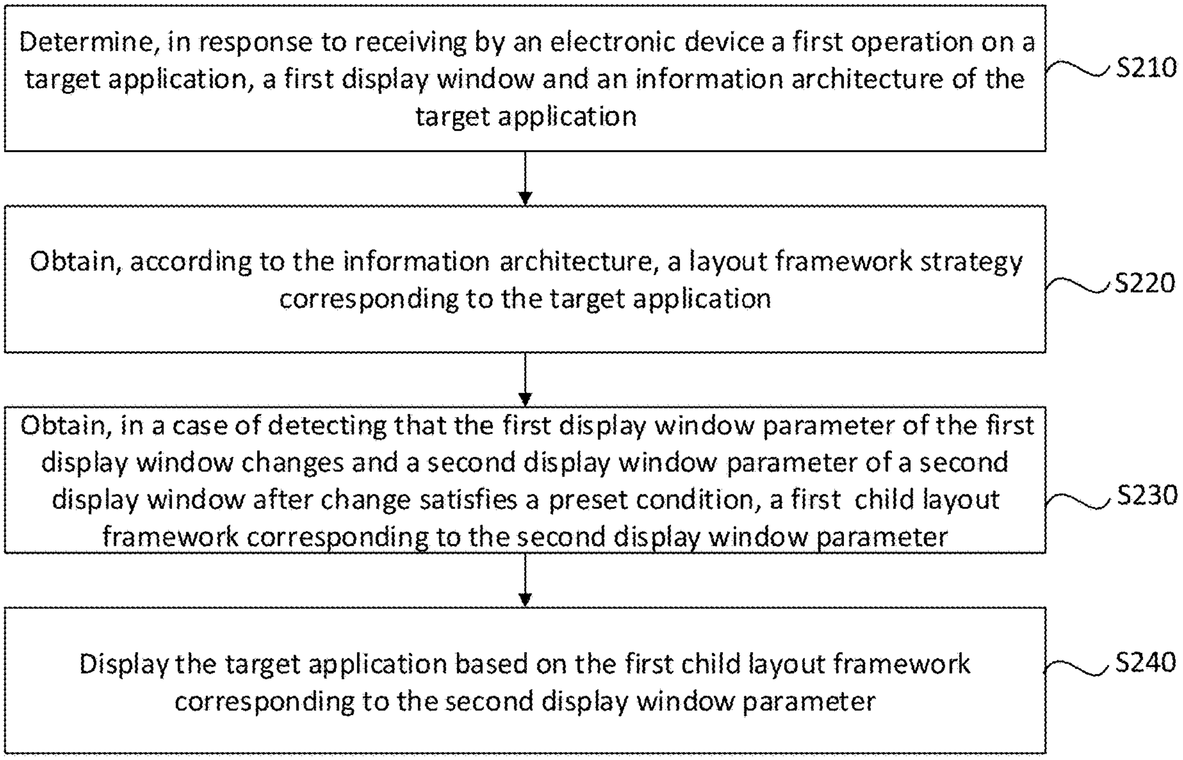
FIG. 4 is a flow diagram of another method for displaying an application as shown according to an example.

FIG. 4 is a flow diagram of another method for displaying an application as shown according to an example. As shown in FIG. 4, the method for displaying an application is used in an electronic device and includes the following steps.

Step S210: determine, in response to receiving by the electronic device a first operation on a target application, a first display window and an information architecture of the target application.

The specific embodiment of step S210 is described in detail in the above examples and will not be repeated here.

Step S220: obtain, according to the information architecture, a layout framework strategy corresponding to the target application.

As an optional embodiment, in a process of obtaining, according to the information architecture, the layout framework strategy corresponding to the target application, whether the target application is provided with a navigation structure may be determined according to the information architecture of the target application in an example of the disclosure. If it is determined based on the information architecture that the target application is provided with no navigation structure, the first layout framework strategy may be determined as the layout framework strategy corresponding to the target application in an example of the disclosure. The first layout framework strategy may be shown in FIG. 5. It can be known from FIG. 5 that the first layout framework strategy is provided with no navigation structure and involves a primary page and a secondary page.

Figure 5:
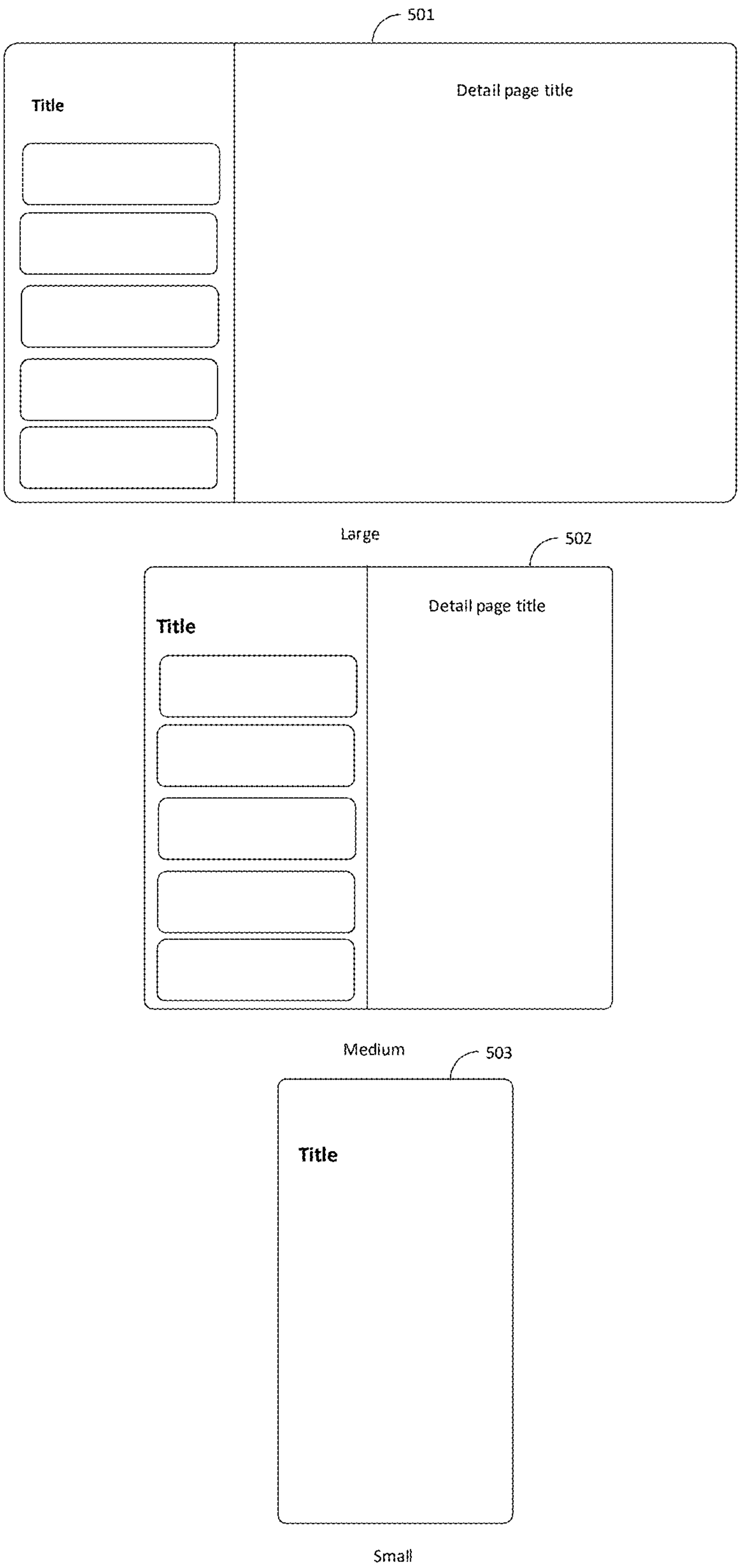
FIG. 5 is an illustrative diagram of a first layout framework strategy in yet another method for displaying an application as shown according to an example.

Alternatively, it can be known from FIG. 5 that the first layout framework strategy may include a plurality of first child layout frameworks. If the first display window parameters of the first display window are different, corresponding first child layout frameworks are different. For instance, the first child layout framework 501 may be a child layout framework corresponding to a large display window in a case of the first layout framework strategy. The first child layout framework 502 may be a child layout framework corresponding to a medium display window in a case of the first layout framework strategy. The first child layout framework 503 may be a child layout framework corresponding to a small display window in a case of the first layout framework strategy.

It can be seen that the first layout framework strategy is applicable to an application that is provided with no navigation structure. For instance, an application that is provided with no navigation structure may be a "setting" application.

As another optional embodiment, if it is determined based on the information architecture that the target application is provided with the navigation structure, a display structure of the target application may be obtained in an example of the disclosure. The display structure of the target application may include a flat structure and a hierarchical structure. In a case that it is determined that the display structure of the target application is a flat structure, the second layout framework strategy may be determined as the layout framework strategy corresponding to the target application in an example of the disclosure. The second layout framework strategy may be shown in FIG. 6. It can be known from FIG. 6 that the second layout framework strategy is provided with the navigation structure and involves bottom tab navigation.

Figure 6:
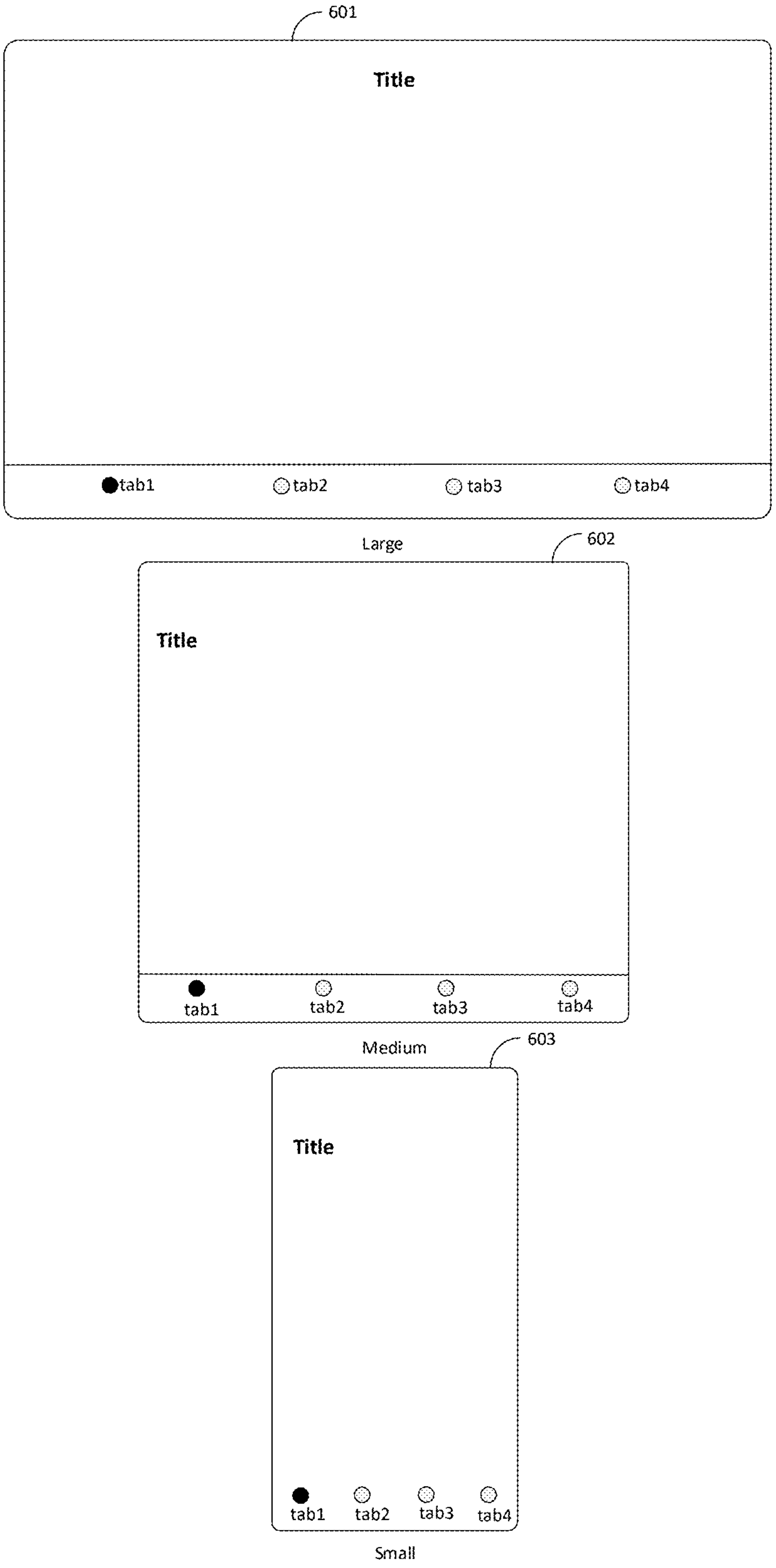
FIG. 6 is an illustrative diagram of a second layout framework strategy in yet another method for displaying an application as shown according to an example.

Alternatively, it can be known from FIG. 6 that the second layout framework strategy is similar to the first layout framework strategy, and may also include a plurality of first child layout frameworks. If the first display window parameters of the first display window are different, the corresponding first child layout frameworks are different. For instance, the first layout sub-framework 601 may be a child layout sub-framework corresponding to a large display window in a case of the second layout framework strategy. The first child layout framework 602 may be a child layout framework corresponding to a medium display window in a case of the second layout framework strategy. The first child layout framework 603 may be a child layout framework corresponding to a small display window in a case of the second layout framework strategy.

It can be seen that the second layout framework strategy is applicable to the application that is provided with a navigation structure. A display structure of the application may be a flat structure. For instance, an application that is provided with a navigation structure and has a display structure that is a flat structure may be a "clock" application.

As another optional embodiment, if it is determined based on the information architecture that the target application is provided with a navigation structure, and it is determined that a display structure of the target application is a hierarchical structure, a number of levels of the target application may be obtained in an example of the disclosure. In a case that the number of levels is less than a preset number, a third layout framework strategy is determined as the layout framework strategy corresponding to the target application. The third layout framework strategy may involve a navigation bar and a content area. The third layout framework strategy may be shown in FIG. 7. For instance, the preset number may be 3 here. It can be seen from FIG. 7 that the third layout framework strategy is provided with a navigation structure. The display structure is a hierarchical structure that has a corresponding number of levels of 2. It can be seen that a number of levels of the target application is less than 3.

Figure 7:
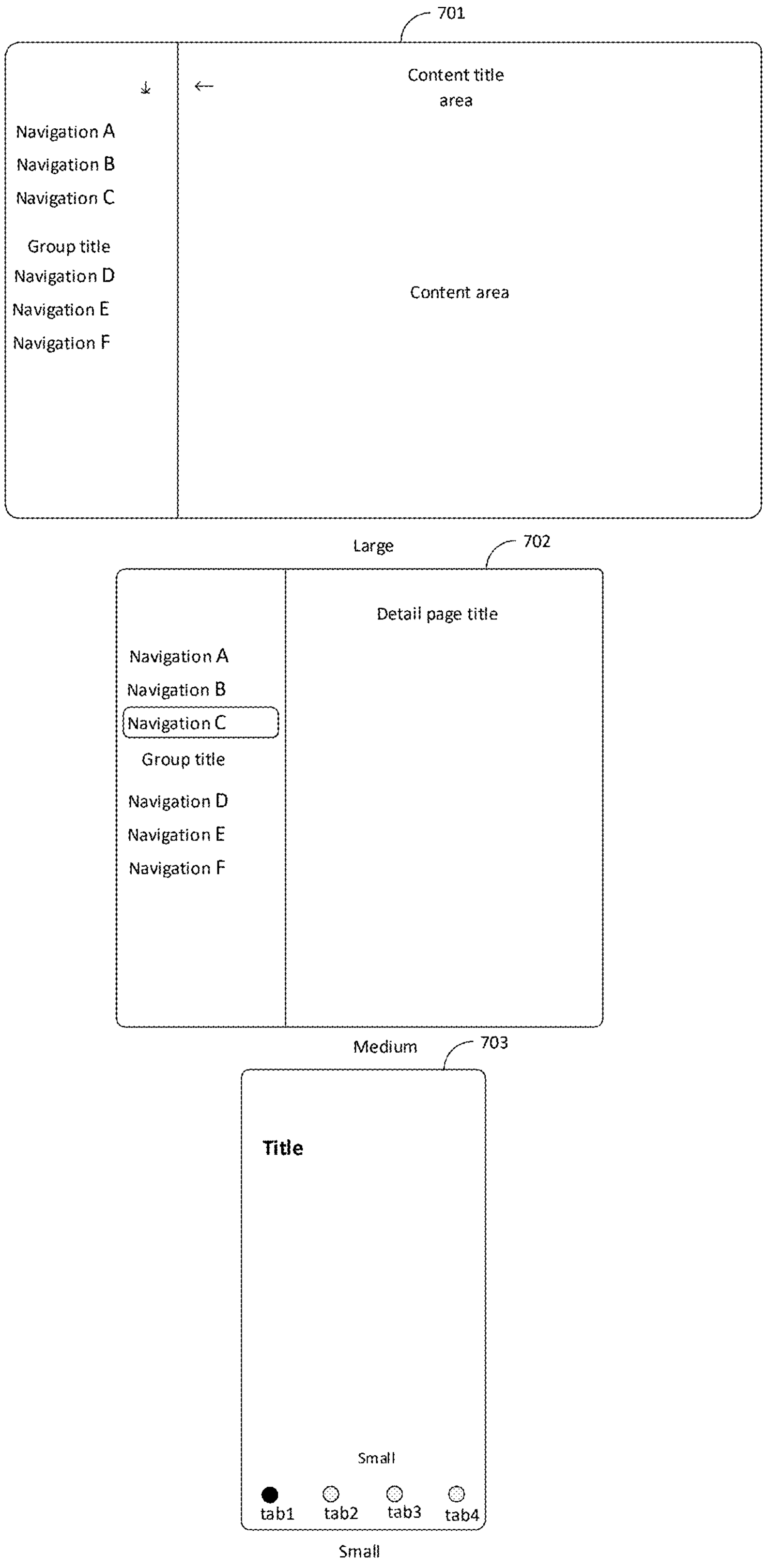
FIG. 7 is an illustrative diagram of a third layout framework strategy in yet another method for displaying an application as shown according to an example.

Alternatively, it can be known from FIG. 7 that the third layout framework strategy is similar to the first layout framework strategy and the second layout framework strategy, and may also include a plurality of first child layout frameworks. If the first display window parameters of the first display window are different, corresponding first child layout frameworks are also different. For instance, the first child layout framework 701 may be a child layout framework corresponding to a large display window in a case of the third layout framework strategy. The first child layout framework 702 may be a child layout framework corresponding to a medium display window in a case of the third layout framework strategy. The first child layout framework 703 may be a child layout framework corresponding to a small display window in a case of the third layout framework strategy.

It can be seen that the third layout framework strategy is applicable to the application that is provided with a navigation structure. The display structure of the application may be a hierarchical structure. The number of levels of the hierarchical structure is less than the preset number. For instance, the application that is provided with a navigation structure, and has a display structure that is a hierarchical structure and has a number of levels less than the preset number, may be a "file management" application or an "album" application. In addition, since structures of the "file management" application and the "album" applications include hierarchical structures, such applications can use sidebar structures.

As another optional embodiment, if it is determined based on the information architecture that the target application is provided with a navigation structure, and it is determined that a display structure of the target application is a hierarchical structure, a number of levels of the target application may be obtained in an example of the disclosure. In a case that the number of levels is greater than the preset number, a fourth layout framework strategy is determined as the layout framework strategy corresponding to the target application. The fourth layout framework strategy may involve a navigation bar, a primary page and a secondary page. The fourth layout framework strategy may be shown in FIG. 8.

Figure 8:
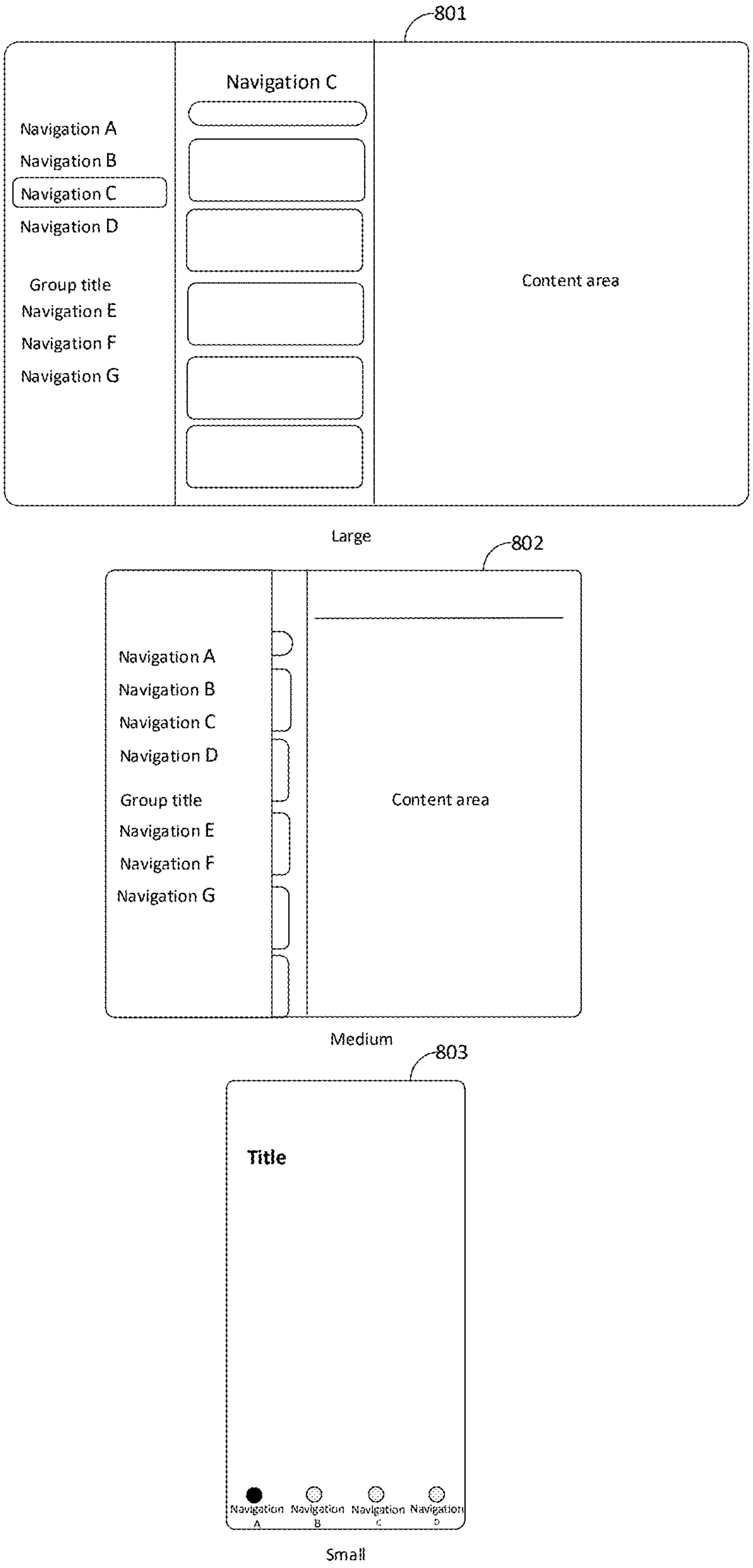
FIG. 8 is an illustrative diagram of a fourth layout framework strategy in yet another method for displaying an application as shown according to an example.

Alternatively, it can be known from FIG. 8 that the fourth layout framework strategy is similar to the first layout framework strategy, the second layout framework strategy and the third layout framework strategy, and may also include a plurality of first child layout frameworks. If the first display window parameters of the first display window are different, corresponding first child layout frameworks are different. For instance, the first child layout framework 801 may be a child layout framework corresponding to a large display window in a case of the fourth layout framework strategy. The first child layout framework 802 may be a child layout framework corresponding to a medium display window in a case of the fourth layout framework strategy. The first child layout framework 803 may be a child layout framework corresponding to a small display window in a case of the fourth layout framework strategy.

It can be seen that the fourth layout framework strategy is applicable to the application that is provided with a navigation structure. The display structure of the application may be a hierarchical structure. A number of levels of the hierarchical structure is greater than or equal to the preset number. For instance, an application that is provided with a navigation structure, and has a display structure that is a hierarchical structure and has a number of levels greater than or equal to the preset number may be a "note" application. In addition, since a structure of the "note" application includes a hierarchical structure, such application may also use a sidebar structure.

As another optional embodiment, in a case that a number of levels is greater than the preset number, a type of the electronic device may be obtained in an example of the disclosure. A fourth layout framework strategy corresponding to the type of the electronic device is determined. The fourth layout framework strategy is determined as the layout framework strategy corresponding to the target application. It can be seen that different types of electronic devices may correspond to different layout framework strategies.

As a specific embodiment, in a case that the type of the electronic device is a pad computer, the corresponding fourth layout framework strategy may be shown in FIG. 8. It can be known from FIG. 8 that if the pad computer is horizontally placed, a navigation bar in the corresponding first child layout framework 802 may be displayed in suspension.

Figure 9:
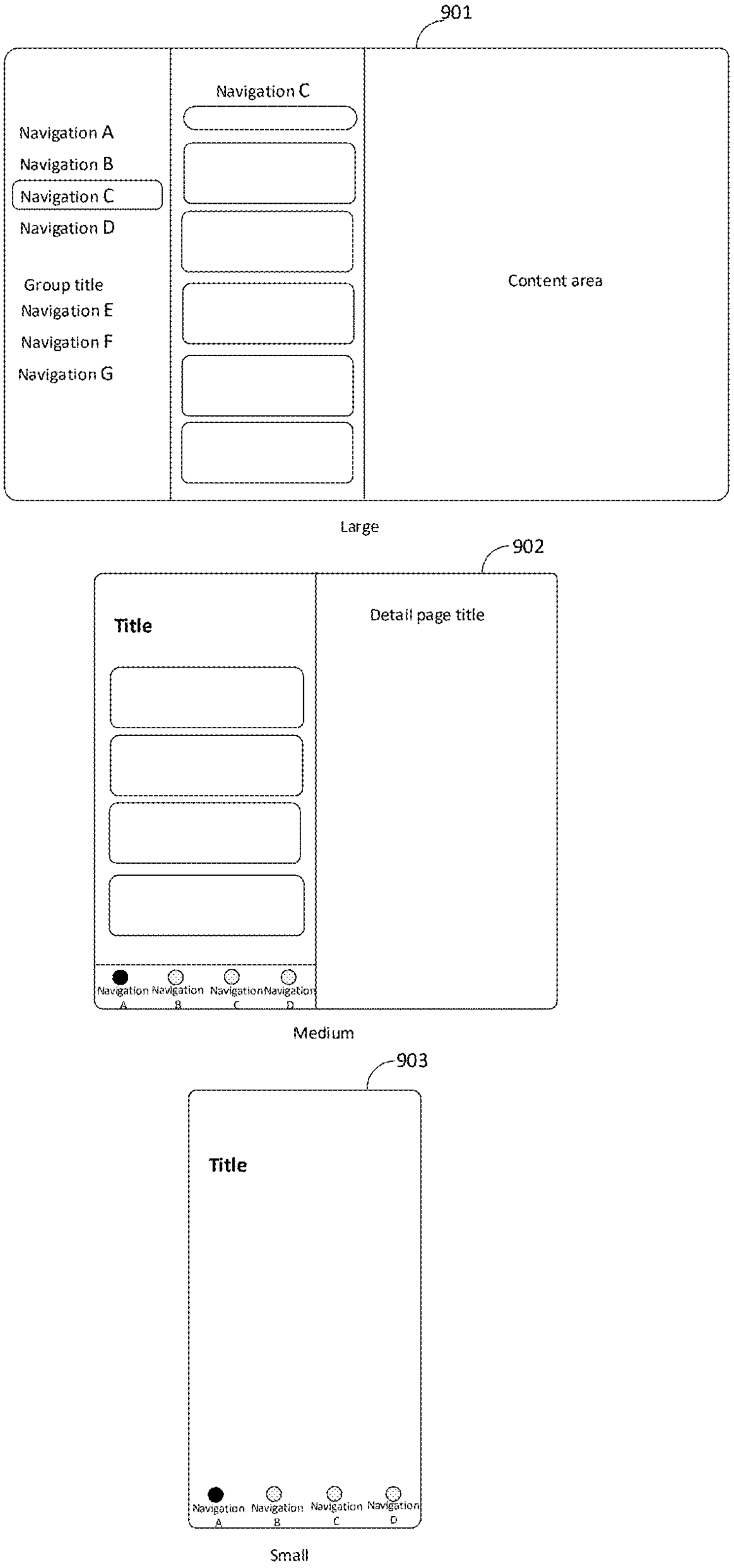
FIG. 9 is an illustrative diagram of a fourth layout framework strategy in yet another method for displaying an application as shown according to an example.

As another specific embodiment, in a case that the electronic device is a foldable screen, the corresponding fourth layout framework strategy may be shown in FIG. 9. It can be known from FIG. 9 that in a case that the electronic device is a foldable screen, a navigation bar in the corresponding first child layout framework 902 may be displayed on a screen in a form of a bottom tab structure and is not required to be displayed in suspension.

Alternatively, it can be known from FIG. 9 that the fourth layout framework strategy is similar to the first layout framework strategy, the second layout framework strategy and the third layout framework strategy, and may also include a plurality of first child layout frameworks. If the first display window parameters of the first display window are different, corresponding first child layout frameworks are different. For instance, the first child layout framework 901 may be a child layout framework corresponding to a large display window in a case of the fourth layout framework strategy. The first child layout framework 902 may be a child layout framework corresponding to a medium display window in a case of the fourth layout framework strategy. The first child layout framework 903 may be a child layout framework corresponding to a small display window in a case of the fourth layout framework strategy.

Figure 10:
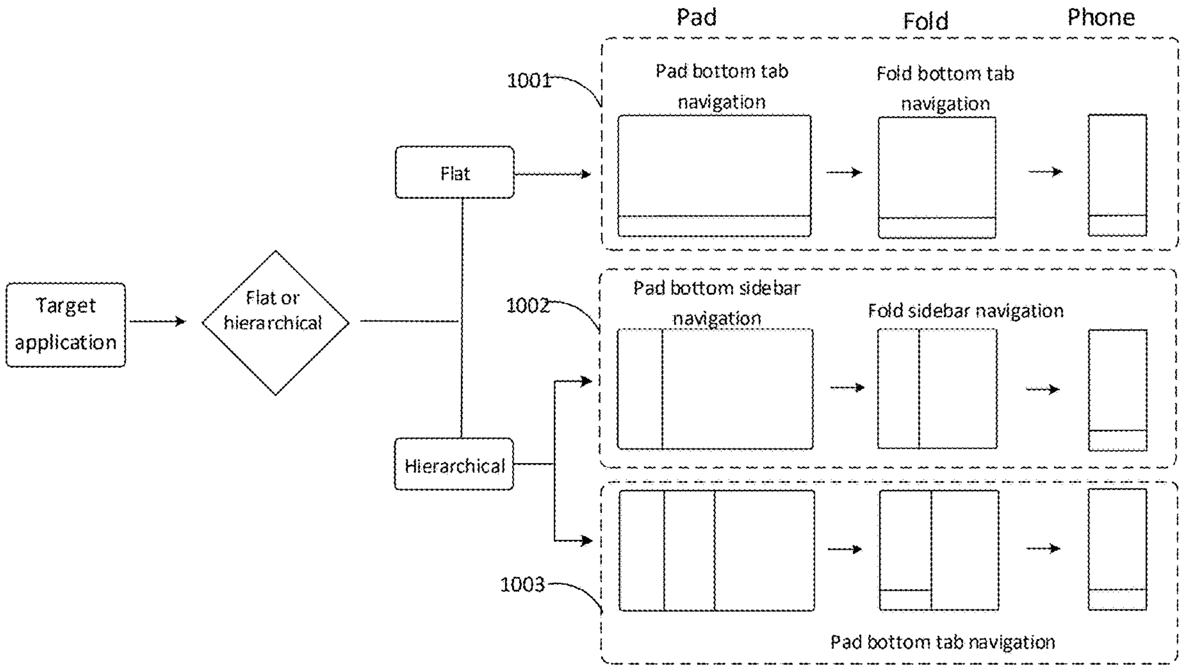
FIG. 10 is an illustrative diagram of a process of determining a layout framework strategy in still another method for displaying an application as shown according to an example.

In order to better understand a process of determining a layout framework strategy, an example of the disclosure provides an illustrative diagram shown in FIG. 10. It can be seen from FIG. 10 that if the target application (APP) is a flat structure, the corresponding electronic device may use a layout framework strategy 1001. If the target program is a hierarchical structure, the type of the electronic device may be obtained. If the electronic device is a pad computer, a layout framework strategy 1002 may be used. Alternatively, if the electronic device is a foldable screen, a layout framework strategy 1003 may be used. It can be seen that in a case that the application is flat navigation, the bottom tab structure may be used. In a case that the application is a hierarchical navigation, the sidebar structure may be used.

It should be noted that the electronic device in an example of the disclosure may be not only a pad computer, a foldable screen and a mobile phone, but also a wearable device, a reader, a computer, etc. The wearable device may be a watch.

Step S230: obtain, in a case of detecting that the first display window parameter of the first display window changes and a second display window parameter of a second display window after change satisfies a preset condition, a first child layout framework corresponding to the second display window parameter.

As an optional embodiment, after the target application is displayed based on the first child layout framework, if it is detected that the first display window for the first display window changes, and the second display window parameter of the second display window after change satisfies the preset condition, the first child layout framework corresponding to the second display window parameter may be obtained in an example of the disclosure.

Here, a window after the first display window parameter changes may be the second display window. A case that the second display window parameter of the second display window after change satisfies the preset condition may be a case that the first display window parameter and the second display window parameter belong to different parameter ranges.

Specifically, the case that the first display window parameter and the second display window parameter belong to different parameter ranges may be a case that a width in the second display window parameter and a width in the first display window parameter belong to different width ranges. For instance, the width in the first display window parameter is greater than the second width threshold and belongs to a first width range. The width in the second display window parameter is greater than the first width threshold and less than the second width threshold and belongs to a second width range. In this case, it can be determined that the width in the first display window parameter and the width in the second display window parameter belong to different width ranges. The second display window parameter satisfies the preset condition.

Alternatively, the first display window parameter and the second display window parameter belong to different parameter ranges, which may also refer to the height in the first display window parameter and the height in the second display window parameter belonging to different height ranges. For instance, the height in the first display window parameter is greater than the first height threshold and belongs to a first height range. The height in the second display window parameter is less than the first height threshold and belongs to a second height range. In this case, it can be determined that the height in the first display window parameter and the height in the second display window parameter belong to different height ranges. The second display window parameter satisfies the preset condition.

Alternatively, the first display window parameter and the second display window parameter belong to different parameter ranges, which may also refer to the width in the first display window parameter and the width in the second display window parameter belonging to different width ranges, and the height in the first display window parameter and the height in the second display window parameter belong to different height ranges.

Alternatively, the second display window after change satisfies the preset condition, which may also refer to the first display window and the second display window belonging to different window types. For instance, the first display window belongs to a large display window and the second display window belongs to a medium display window. In this case, it can be determined that the first display window and the second display window belong to different window types, and it is determined that the second display window parameter satisfies the preset condition. How to specifically determine whether the second display window parameter satisfies the preset condition is not explicitly limited here and may be selected according to actual conditions.

Step S240: display the target application based on the first child layout framework corresponding to the second display window parameter.

It can be known from the above-mentioned introduction that in a case of detecting that the display window parameter of the target application changes and the display window parameter after change satisfies the preset condition, the child layout framework may be reacquired in an example of the disclosure. On this basis, the target application may be displayed based on the reacquired first child layout framework in an example of the disclosure. Here, the reacquired first child layout framework may also be referred to as a second child layout framework. That is, based on the second child layout framework, the target application may be displayed in the second display window in an example of the disclosure.

As an instance, in a case that the electronic device is a pad computer and the pad computer is horizontally placed, the target application may be displayed in the first child layout framework in an example of the disclosure. Then, if the pad computer is changed from being horizontally placed to vertically placed, the target program can be displayed in the second child layout framework. It can be seen that when the display window parameter of the electronic device changes and the display window parameter after change satisfies the preset condition, the target application can be displayed in the child layout framework corresponding to the display parameter after change.

As another instance, in a case that the electronic device is a pad computer and the pad computer is horizontally placed, the target application may be displayed in the first child layout framework in an example of the disclosure. Then, if the user displays the target application on the pad computer in a partially split screen manner through an operation, a window parameter of the target application in a case of partial split screen may be obtained, and a child layout framework corresponding to the window parameter is obtained. On this basis, the target application is displayed based on the child layout framework (i.e. second child layout framework). Here, the display window corresponding to partial split screen may be referred to as a second display window, and a window parameter in a case of partial split screen satisfies a preset condition. In an example of the disclosure, the target application may be displayed based on a second child layout framework corresponding to a newly obtained second display window parameter.

According to the disclosure, a set of general technical framework can be adapted to different terminals of different windows such that applications of different services can be adapted to different terminals and windows by accessing the set of general interactive framework. In this way, services can be low in cost and high in code uniformity.

In addition, according to the disclosure, an adaptive interactive display mode of different windows in a case of a multi-terminal application may be applied. Different interface framework codes of different device types are integrated, and uniformly accessed to a new interactive framework (e.g. MIUIX). Interface display on different types of electronic devices can be completed by virtue of an adaptive capability of the new interactive framework such that a purpose that one set of codes are applicable to a plurality of terminals can be achieved, and redundant code logic and interface resources are reduced.

According to an example of the disclosure, in response to receiving by an electronic device a first operation on a target application, a first display window for the target application is determined. Then, a first display window parameter of the first display window is determined. A target layout framework corresponding to the target application is determined based on the first display window parameter. The target application is displayed in the first display window based on the target layout framework. In this way, the disclosure can be adapted to different display windows, that is, different types of electronic devices. Further, cost of service access can be reduced, and flexibility of displaying the application can be improved. In addition, in an example of the disclosure, re-layout may be carried out in real time according to a strategy. That is, re-layout may be carried out according to a change of the display window. An optimal display capability can be ensured.

Figure 11:
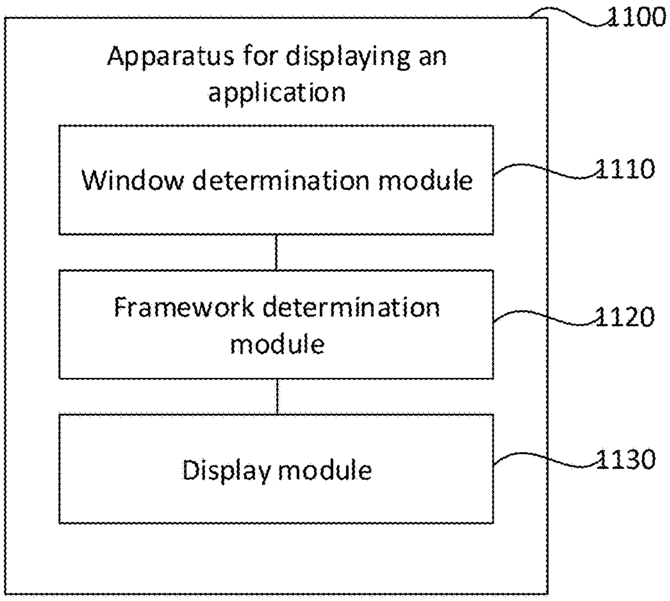
FIG. 11 is a block diagram of an apparatus for displaying an application as shown according to an example.

FIG. 11 is a block diagram of an apparatus 1100 for displaying an application as shown according to an example. With reference to FIG. 11, the apparatus 1100 for displaying an application includes a window determination module 1110, a framework determination module 1120 and a display module 1130.

The window determination module 1110 is configured to determine, in response to receiving by an electronic device a first operation on a target application, a first display window for the target application.

The framework determination module 1120 is configured to determine a first display window parameter of the first display window, and determine, based on the first display window parameter, a target layout framework corresponding to the target application.

The display module 1130 is configured to display the target application in the first display window based on the target layout framework.

In some embodiments, the framework determination module 1120 may include:

- an information architecture obtaining sub-module, which is configured to obtain an information architecture of the target application;
- a framework strategy obtaining sub-module, which is configured to obtain, according to the information architecture, a layout framework strategy corresponding to the target application, where the layout framework strategy includes at least one first child layout framework; and
- a layout framework obtaining sub-module, which is configured to obtain a first child layout framework corresponding to the first display window, and determine the first child layout framework as the target layout framework.

In some embodiments, the apparatus 1100 for displaying an application may further include:

- a new framework obtaining module, which is configured to obtain, in a case of detecting that the first display window parameter of the first display window changes and a second display window parameter of a second display window after change satisfies a preset condition, a first child layout framework corresponding to the second display window parameter; and
- a display sub-module, which is configured to display the target application based on the first child layout framework corresponding to the second display window parameter.

In some embodiments, a case that the second display window parameter of the second display window after change satisfies the preset condition includes a case that the first display window parameter and the second display window parameter belong to different parameter ranges.

In some embodiments, the framework strategy obtaining sub-module is further configured to determine, in response to determining based on the information architecture that the target application is provided with no navigation structure, a first layout framework strategy as the layout framework strategy corresponding to the target application. The first layout framework strategy involves a primary page and a secondary page.

In some embodiments, the framework strategy obtaining sub-module is further configured to obtain a display structure of the target application in response to determining based on the information architecture that the target application is provided with the navigation structure; and determine, in response to determining that the display structure of the target application is a flat structure, a second layout framework strategy as the layout framework strategy corresponding to the target application. The second layout framework strategy involves bottom tab navigation.

In some embodiments, the framework strategy obtaining sub-module is further configured to obtain a number of levels of the target application in response to determining that the display structure of the target application is a hierarchical structure; and

- determine, in a case that the number of levels is less than a preset number, a third layout framework strategy as the layout framework strategy corresponding to the target application. The third layout framework strategy involves a navigation bar and a content area.

In some embodiments, the framework strategy obtaining sub-module is further configured to determine, in a case that the number of levels is greater than the preset number, a fourth layout framework strategy as the layout framework strategy corresponding to the target application. The fourth layout framework strategy includes a navigation bar, a primary page and a secondary page.

In some embodiments, the framework strategy obtaining sub-module is further configured to obtain, in a case that the number of levels is greater than the preset number, the fourth layout framework strategy corresponding to a type of the electronic device, and determine the fourth layout framework strategy as the layout framework strategy corresponding to the target application.

According to an example of the disclosure, in response to receiving by an electronic device a first operation on a target application, a first display window for the target application is determined. Then, a first display window parameter of the first display window is determined. A target layout framework corresponding to the target application is determined based on the first display window parameter. The target application is displayed in the first display window based on the target layout framework. In this way, the disclosure can be adapted to different display windows, that is, different types of electronic devices. Further, cost of service access can be reduced, and flexibility of displaying the application can be improved.

For the apparatus in the above examples, a specific method for each module to execute an operation is described in detail in examples relating to the method and will not be described in detail here.

The disclosure further provides a computer-readable storage medium storing a computer program instruction. The program instruction implements steps of the method for displaying an application provided in the disclosure when executed by a processor.

Figure 12:
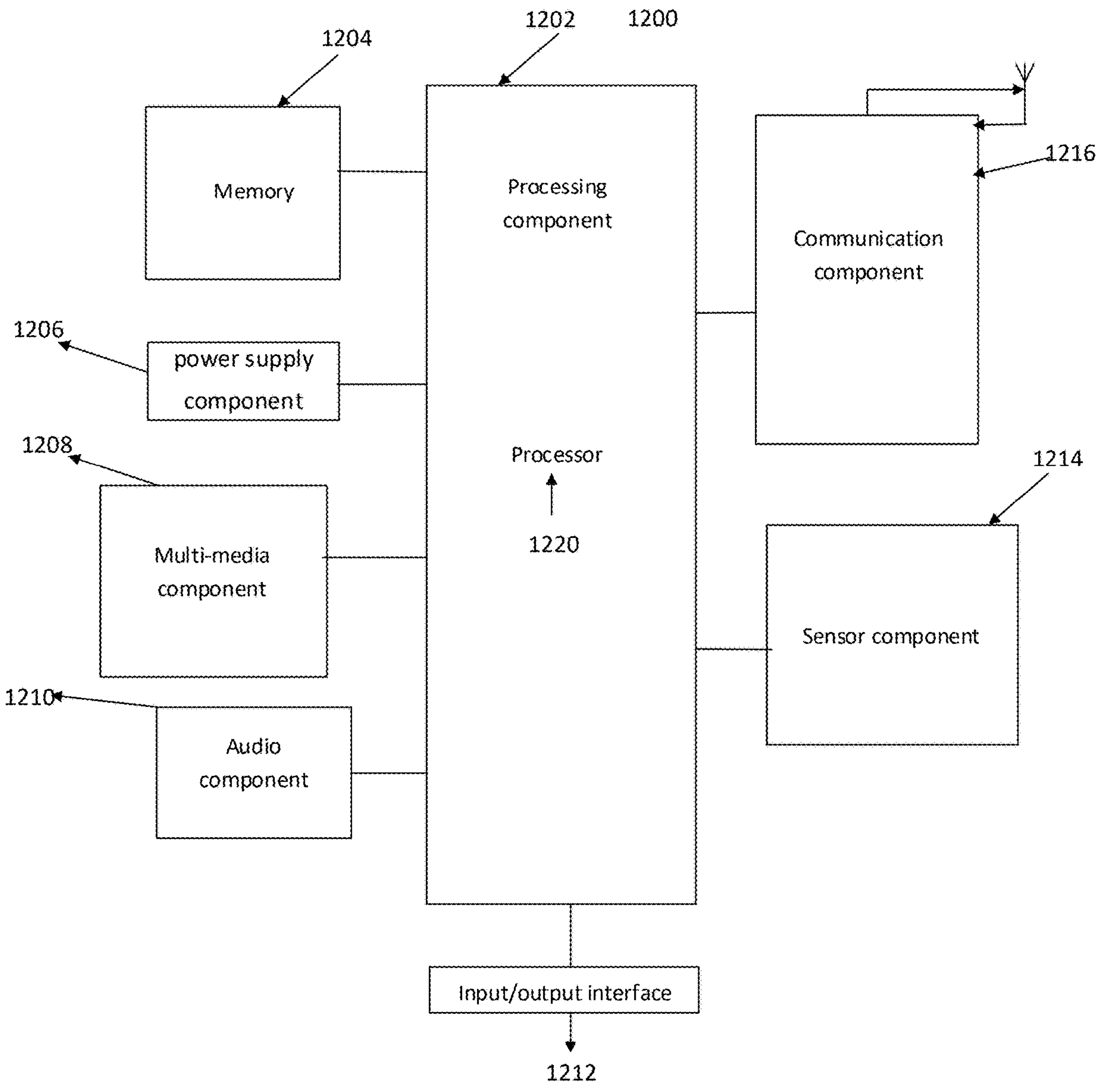
FIG. 12 is a block diagram of an electronic device as shown according to an example.

FIG. 12 is a block diagram of an electronic device 1200 as shown according to an example. For instance, the electronic device 1200 may be a mobile phone, a computer, a digital broadcasting terminal, a message receiving and transmitting device, a game console, a pad computer, a medical device, a fitness device, a personal digital assistant, etc.

With reference to FIG. 12, the electronic device 1200 may include one or more of components as follows: a processing component 1202, a memory 1204, a power supply component 1206, a multi-media component 1208, an audio component 1210, an input/output interface 1212, a sensor component 1214 and a communication component 1216.

The processing component 1202 generally controls overall operations of the electronic device 1200, such as operations associated with display, mobile phone call, data communication, camera operation and record operation. The processing component 1202 may include one or more processors 1220 to execute an instruction, such that all or some steps of the above method for displaying an application are completed. In addition, the processing component 1202 may include one or more modules such that interaction between the processing component 1202 and other components can be facilitated. For instance, the processing component 1202 may include a multi-media module such that interaction between the multi-media component 1208 and the processing component 1202 can be facilitated.

The memory 1204 is configured to store various types of data such that operations at the electronic device 1200 can be supported. Instances of such data include instructions for any application or method operating on the electronic device 1200, contact data, mobile phone book data, messages, pictures, videos, etc. The memory 1204 may be implemented by any type of volatile or non-volatile storage devices or their combinations, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 1206 provides power for various components of the electronic device 1200. The power supply component 1206 may include a power supply management system, one or more power supplies, and other components associated with generation, management and power distribution of the electronic device 1200.

The multi-media component 1208 includes a screen that provides an output interface between the electronic device 1200 and the user. In some examples, the screen may include a liquid crystal display (LCD) and a touch panel (TP). If the screen includes a touch panel, the screen may be implemented as a touch screen such that an input signal from the user can be received. The touch panel includes one or more touch sensors such that a touch, a swipe and a gesture on the touch panel can be sensed. The touch sensor can not only sense a boundary of a touch or swipe, but also measure time and pressure associated with the touch or swipe. In some examples, the multi-media component 1208 includes a front-facing camera and/or a rear-facing camera. When the electronic device 1200 is in an operating mode, such as a shooting mode or a video mode, the front facing camera and/or the rear facing camera may receive external multi-media data. Each of the front-facing camera and the rear-facing camera may be a fixed optical lens system or have focusing and optical zooming capabilities.

The audio component 1210 is configured to output and/or input an audio signal. For instance, the audio component 1210 includes a microphone (MIC), which is configured to receive external audio signals when the electronic device 1200 is in an operating mode, such as a call mode, a recording mode and a voice recognition mode. The received audio signal may be further stored in the memory 1204 or transmitted by means of the communication component 1216. In some examples, the audio component 1210 further includes a loudspeaker configured to output the audio signal.

The input/output interface 1212 provides an interface between the processing component 1202 and peripheral interface modules, such as keyboards, click wheels and buttons. These buttons may include but are not limited to a home button, a volume button, a start button and a locking button.

The sensor component 1214 includes one or more sensors, which are configured to provide status assessment of various aspects of the electronic device 1200. For instance, the sensor component 1214 may detect turned-on/turned off state of the electronic device 1200, and relative positioning of components, such as a display and keypad of the electronic device 1200. The sensor component 1214 may further detect a change in position of the electronic device 1200 or a component of the electronic device 1200, presence or absence of contact between a user and the electronic device 1200, orientation or acceleration/deceleration of the electronic device 1200, and a temperature change of the electronic device 1200. The sensor component 1214 may include a proximity sensor, which is configured to detect the presence of a nearby object in the absence of any physical contact. The sensor component 1214 may further include a light sensor, such as a complementary metal oxide semiconductor (CMOS) or charge coupled device (CCD) image sensor, which are configured to be used in imaging applications. In some examples, the sensor component 1214 may further include an acceleration sensor, a gyroscopic sensor, a magnetic sensor, a pressure sensor or a temperature sensor.

The communication component 1216 is configured to facilitate wired or wireless communication between the electronic device 1200 and other devices. The electronic device 1200 may access a wireless network based on a communication standard, such as Wi-Fi, 2G, 3G or their combinations. In an example, the communication component 1216 receives a broadcast signal or broadcast related information from an external broadcast management system by means of a broadcast channel. In an example, the communication component 1216 further includes a near-field communication (NFC) module such that short-range communication can be facilitated. For instance, the NFC module may be implemented based on a radio frequency identification (RFID) technology, an infrared data association (IrDA) technology, an ultra wideband (UWB) technology, a Bluetooth (BT) technology and other technologies.

In an example, the electronic device 1200 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic elements, which are configured to execute the above-mentioned method for displaying an application.

In an example, a non-transitory computer-readable storage medium including an instruction is further provided, such as a memory 1204 including an instruction. The above-mentioned instruction may be executed by the processor 1220 of the electronic device 1200 to complete the above-mentioned method for displaying an application. For instance, the non-transitory computer-readable storage medium may be an ROM, a random access memory (RAM), a compact disc read-only memory (CD-ROM), a magnetic tape, a floppy disk or an optical data storage device, etc.

In another example, a computer program product is provided. The computer program product includes a computer program capable of being executed by a programmable apparatus. The computer program has a code portion, which is configured to execute the above-mentioned method for displaying an application when executed by the programmable apparatus.

A person skilled in the art could easily conceive of other implementation solutions of the disclosure upon consideration of the description and the disclosure disclosed in the implementation. The disclosure is intended to encompass any variations, uses or adaptive changes of the disclosure, which follow the general principles of the disclosure and include common general knowledge or customary technical means, which is not disclosed in the disclosure, in the art. The description and examples are regarded as illustrative merely. The true scope and spirit of the disclosure are indicated by the following claims.

It should be understood that the disclosure is not limited to a precise structure described above and shown in accompanying drawings, and can have various modifications and changes without departing from the scope of the disclosure. The scope of the disclosure is limited by the appended claims merely.

What is claimed is:

1. A method for displaying an application, comprising:

determining, on a condition that a first operation on a target application is received by an electronic device, a first display window for the target application;

determining a first display window parameter of the first display window, and determining, based on the first display window parameter, a target layout framework corresponding to the target application; and displaying the target application in the first display window based on the target layout framework;

wherein determining, based on the first display window parameter, the target layout framework corresponding to the target application comprises:

obtaining an information architecture of the target application, wherein the information architecture comprises at least one of navigation information, list information, and detail information;

obtaining, according to the information architecture, a layout framework strategy corresponding to the target application, wherein the layout framework strategy comprises at least one first child layout framework; and obtaining a first child layout framework corresponding to the first display window, and determining the first child layout framework as the target layout framework.

2. The method according to claim 1, further comprising:

obtaining, in a case of detecting that the first display window parameter of the first display window changes and a second display window parameter of a second display window after change satisfies a preset condition, a first child layout framework corresponding to the second display window parameter; and displaying the target application based on the first child layout framework corresponding to the second display window parameter.

3. The method according to claim 2, wherein a case that the second display window parameter of the second display window after change satisfies the preset condition comprises a case that the first display window parameter and the second display window parameter belong to different parameter ranges.

4. The method according to claim 1, wherein obtaining, according to the information architecture, the layout framework strategy corresponding to the target application comprises:

determining, on a condition that it is determined based on the information architecture that the target application is provided with no navigation structure, a first layout framework strategy as the layout framework strategy corresponding to the target application, wherein the first layout framework strategy involves a primary page and a secondary page.

5. The method according to claim 4, further comprising:

obtaining a display structure of the target application on a condition that it is determined based on the information architecture that the target application is provided with a navigation structure; and determining, on a condition that the display structure of the target application is determined to be a flat structure, a second layout framework strategy as the layout framework strategy corresponding to the target application, wherein the second layout framework strategy involves bottom tab navigation.

6. The method according to claim 5, further comprising: obtaining a number of levels of the target application on a condition that the display structure of the target application is determined to be a hierarchical structure; and determining, in a case that the number of levels is less than a preset number, a third layout framework strategy as the layout framework strategy corresponding to the target application, wherein the third layout framework strategy involves a navigation bar and a content area.

7. The method according to claim 6, further comprising: determining, in a case that the number of levels is greater than the preset number, a fourth layout framework strategy as the layout framework strategy corresponding to the target application, wherein the fourth layout framework strategy comprises a navigation bar, a primary page and a secondary page.

8. The method according to claim 7, wherein determining, in a case that the number of levels is greater than the preset number, the fourth layout framework strategy as the layout framework strategy corresponding to the target application comprises:

obtaining, in a case that the number of levels is greater than the preset number, the fourth layout framework strategy corresponding to a type of the electronic device, and determining the fourth layout framework strategy as the layout framework strategy corresponding to the target application.

9. An electronic device, comprising:

a processor; and a memory configured to store a processor-executable instruction; wherein the processor is configured to:

determine, on a condition that a first operation on a target application is received by the electronic device, a first display window for the target application;

determine a first display window parameter of the first display window, and determine, based on the first display window parameter, a target layout framework corresponding to the target application; and display the target application in the first display window based on the target layout framework;

wherein the processor is further configured to:

obtain an information architecture of the target application, wherein the information architecture comprises at least one of navigation information, list information, and detail information;

obtain, according to the information architecture, a layout framework strategy corresponding to the target application, wherein the layout framework strategy comprises at least one first child layout framework; and obtain a first child layout framework corresponding to the first display window, and determine the first child layout framework as the target layout framework.

10. The electronic device according to claim 9, wherein the processor is configured to:

obtain, in a case of detecting that the first display window parameter of the first display window changes and a second display window parameter of a second display window after change satisfies a preset condition, a first child layout framework corresponding to the second display window parameter; and display the target application based on the first child layout framework corresponding to the second display window parameter.

11. The electronic device according to claim 10, wherein a case that the second display window parameter of the second display window after change satisfies the preset condition comprises a case that the first display window parameter and the second display window parameter belong to different parameter ranges.

12. The electronic device according to claim 9, wherein the processor is configured to:

determine, on a condition that it is determined based on the information architecture that the target application is provided with no navigation structure, a first layout framework strategy as the layout framework strategy corresponding to the target application, wherein the first layout framework strategy involves a primary page and a secondary page.

13. The electronic device according to claim 12, wherein the processor is configured to:

obtain a display structure of the target application on a condition that it is determined based on the information architecture that the target application is provided with a navigation structure; and determine, on a condition that the display structure of the target application is determined to be a flat structure, a second layout framework strategy as the layout framework strategy corresponding to the target application, wherein the second layout framework strategy involves bottom tab navigation.

14. The electronic device according to claim 13, wherein the processor is configured to:

obtain a number of levels of the target application on a condition that the display structure of the target application is determined to be a hierarchical structure; and determine, in a case that the number of levels is less than a preset number, a third layout framework strategy as the layout framework strategy corresponding to the target application, wherein the third layout framework strategy involves a navigation bar and a content area.

15. The electronic device according to claim 14, wherein the processor is configured to:

determine, in a case that the number of levels is greater than the preset number, a fourth layout framework strategy as the layout framework strategy corresponding to the target application, wherein the fourth layout framework strategy comprises a navigation bar, a primary page and a secondary page.

16. The electronic device according to claim 15, wherein the processor is configured to:

obtain, in a case that the number of levels is greater than the preset number, the fourth layout framework strategy corresponding to a type of the electronic device, and determine the fourth layout framework strategy as the layout framework strategy corresponding to the target application.

17. A non-transitory computer-readable storage medium, storing a computer program instruction that, when executed by a processor, causes the processor to:

determine, on a condition that a first operation on a target application is received by an electronic device, a first display window for the target application;

determine a first display window parameter of the first display window, and determine, based on the first display window parameter, a target layout framework corresponding to the target application; and display the target application in the first display window based on the target layout framework;

wherein the processor is further configured to:

obtain an information architecture of the target application, wherein the information architecture comprises at least one of navigation information, list information, and detail information;

obtain, according to the information architecture, a layout framework strategy corresponding to the target application, wherein the layout framework strategy comprises at least one first child layout framework; and obtain a first child layout framework corresponding to the first display window, and determine the first child layout framework as the target layout framework.

* * * * *